United States Patent [19]
Sallberg

[11] Patent Number: 6,137,783
[45] Date of Patent: Oct. 24, 2000

[54] SYSTEM AND METHOD FOR REDUCED NETWORK INFORMATION HANDOVERS

[75] Inventor: Krister Sallberg, Lund, Sweden

[73] Assignee: Ericsson Inc, Research Triangle Park, N.C.

[21] Appl. No.: 08/982,990

[22] Filed: Dec. 2, 1997

[51] Int. Cl.[7] .............................. H04B 7/185; H04Q 7/00
[52] U.S. Cl. ......................... 370/316; 370/331; 455/428; 455/436
[58] Field of Search ..................................... 370/316, 323, 370/325, 328, 329, 331, 332, 333, 334, 338; 455/426, 427, 428, 436

[56] References Cited

U.S. PATENT DOCUMENTS

| | | | |
|---|---|---|---|
| 5,822,309 | 10/1998 | Ayanoglu et al. | 370/315 |
| 5,825,759 | 10/1998 | Liu | 370/331 |
| 5,867,765 | 2/1999 | Nilsson | 455/13.1 |

FOREIGN PATENT DOCUMENTS 0 731 620 A2  1/1996  European Pat. Off. .

OTHER PUBLICATIONS

Zhao et al., Internetwork Handover Performance Analysis in a GSM–Satellite Integrated Mobile Communication System, IEEE, vol. 15, No. 8, Oct. 1997, pp. 1657–1670.

Vriendt et al., The UMTS Mobility Server: a Solution to Support Third Generation Mobility in ATM, Feb. 21, 1996, pp. 251–262.

*Primary Examiner*—Chi H. Pham
*Assistant Examiner*—Kwang B. Yao
*Attorney, Agent, or Firm*—Jenkens & Gilchrist

[57] ABSTRACT

A system and method for reducing or eliminating the transference of mobile terminal mobility management information caused by temporary signal interferences blocking communications is disclosed. When the distance of a mobile terminal from a base station servicing a first network system exceeds a threshold value, the mobile terminal's distances from other base stations (servicing other network systems) are determined and the shortest distance, corresponding to a second network system, is selected and control transferred. The mobility management information for the mobile terminal, however, resident within the first network system, remains within the first network system after the control transference, the information being accessible by the second network system via a packet switch interconnecting the first and second network systems.

26 Claims, 8 Drawing Sheets

SYSTEM AND METHOD FOR REDUCED NETWORK INFORMATION HANDOVERS

BACKGROUND OF THE PRESENT INVENTION

1. Field of the Invention

The present invention relates in general to improvements in telecommunications, particularly to a system and method for satellite-based telecommunications, and, more particularly, to a system and method for reducing handovers within a satellite-based telecommunications system.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue in the coming decades as well, as this wireless network interacts with and eventually overtakes the existing wireline networks.

With the proposed launch and use of large numbers of satellites to mediate the exchange of voice and data messages between the terrestrially-based users, the complete coverage of the Earth by a constellation of orbiting satellites, such as Motorola's Iridium, Globalstar, Teledesics, ICO and others, is becoming a reality. A dominate communication standard for those satellites, as well as many current terrestrially-based cellular systems, is the Global System for Mobile (GSM) communications, the first system to specify digital modulation and network level architectures and services. Numerous additional protocols, including the General Packet Radio Service (GPRS), have been defined for GSM.

Whenever a cellular user, such as in a cellular system, within one defined communications area, such as a cell, moves from that cell to another cell, a handover of control over that call is performed by the governing cellular system. If the intercell movement is within a common Mobile Switching Center (MSC) area, the pertinent MSC governing those cells transfers or handovers the call to a new channel belonging to a new Base Station (BS) associated with the new cell. Basically, the control information for a Mobile Subscriber (MS) within the MSC area (contained within a Visitor Location Register or VLR, integrated with the respective MSC) remains constant with some minor routing changes.

As should be expected, inter-MSC movement entails transfers of information from one MSC/VLR to another as well as an update of routing information to a Home Location Register (HLR), which is a database maintaining subscriber information for the users of the cellular system, e.g., user profiles, current location and routing information, International Mobile subscriber Identity (IMSI) numbers, and other administrative information. Naturally, when a mobile terminal (MT) user moves between disparate cellular systems, this entails elaborate subscriber information exchanges between the respective MSC/VLRs and HLRs. Since such data exchanges are quite complex, they should not be performed frequently, e.g., an MT user near a border between two cellular systems should not unnecessarily repeatedly switch between those systems.

Shading and other signal interference effects due to large buildings or terrain blockage are typical for satellite-based systems, affecting mobility management within such systems as well. For example, the sight or aspect of different satellites orbiting over a given earth position changes when a subscriber's MT moves. A building, a line of trees, a mountain, etc., may temporarily block one or more orbiting satellites from communicating with a moving MT adjacent to these obstructions. Also, since the satellites may themselves move relative to the Earth, i.e., they are not geosynchronous, the satellite beams may sweep across the earth's surface, necessitating handovers of those MTs in communication with the receding satellite to other ascending satellite(s) within the constellation. Thus handovers may occur even for stationary MTs.

In an effort to maintain good communication connections in satellite-based systems, changing satellites is frequently necessary due to the aforementioned shading and signal interference effects. Although a mobile terminal's inter-satellite transfers are necessary in such instances, one of the problems with frequent satellite (and terrestrial satellite base station) changeovers is that the assortment of mobility management information associated with the mobile terminal must also be transferred. Reducing or eliminating the transference of the mobility management information would increase system performance.

It is, accordingly, an object of the present invention to provide a system and method for reducing the amount of mobile terminal mobility management information being transferred within a satellite system, thereby optimizing system performance.

SUMMARY OF THE INVENTION

The present invention is directed to a system and method for reducing or eliminating the transference of mobile terminal mobility management information caused by temporary signal interferences blocking communications. In particular, an inter-network system transference of control for a given mobile terminal is warranted when the mobile terminal's distance from a base station servicing a first network system exceeds a threshold value. When the distance so exceeds the threshold value, the mobile terminal's distances from other base stations (servicing other network systems) are determined and the shortest distance, corresponding to a second network system, is selected. The mobility management information for the mobile terminal, resident within the first network system, remains within the first network system after the control transference, the information being accessible by the second network system via a packet switch interconnecting the first and second network systems.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
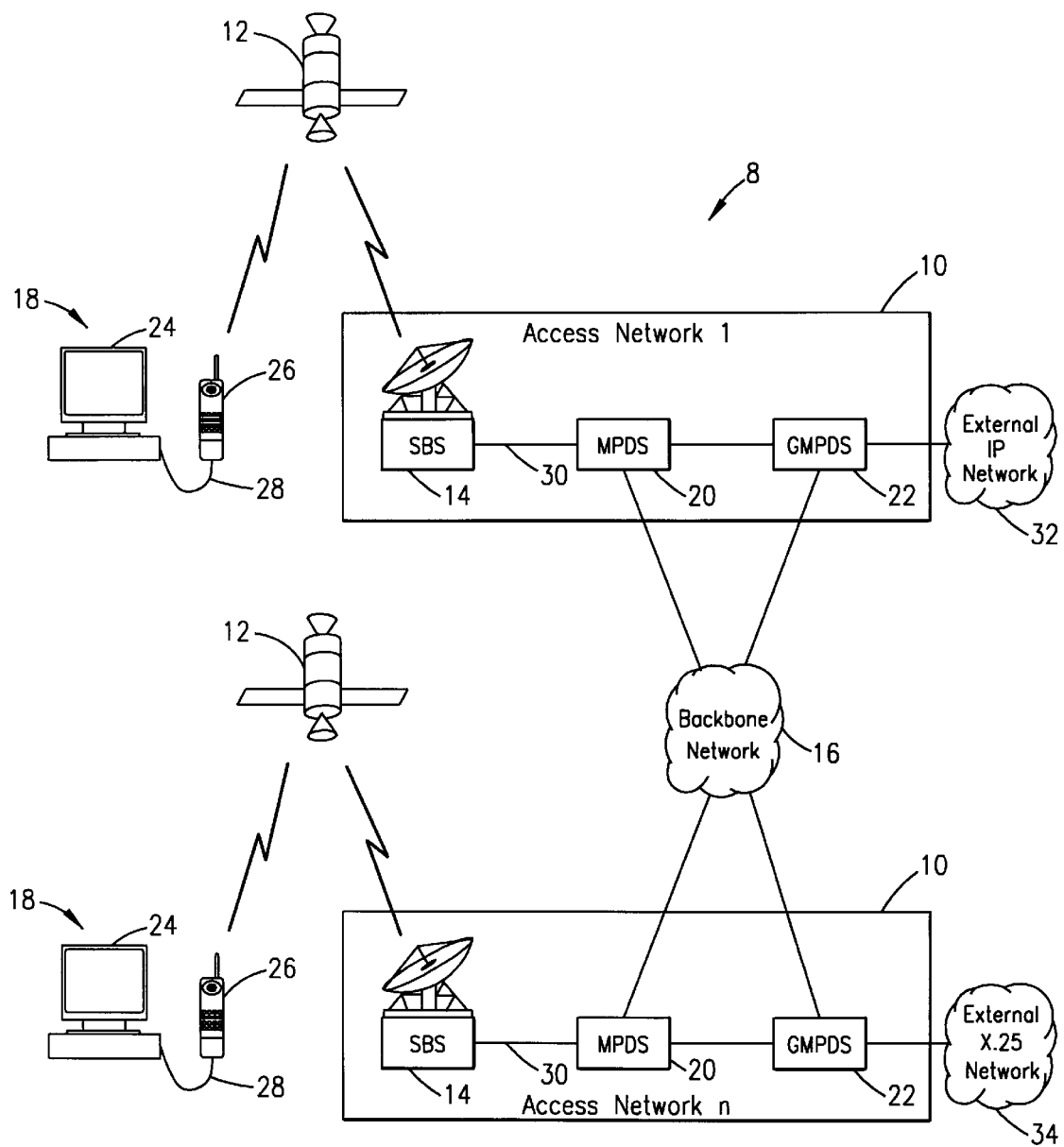
FIG. 1 is a schematic diagram of a satellite communications system providing packet switched data services.

With reference now to FIG. 1 of the drawings, there is illustrated a conventional satellite network architecture providing a packet switched service, illustrating two Satellite Access Networks (SANs) 10, each in communication with at least one orbiting satellite 12 via respective Satellite Base Stations (SBSs) 14 and with each other across a backbone network 16. In a preferred embodiment of the present invention, the present invention is directed to packet data services, e.g., the aforementioned General Packet Radio Service (GPRS) currently under standardization in the European Telecommunications Standard Institute (ETSI) for GSM usage.

Another packet data protocol, Cellular Digital Packet Data (CDPD), is presently used in the analog Advanced Mobile Phone System (AMPS) system. The specification for Digital AMPS (D-AMPS) has not yet been resolved. Whereas both GPRS and CDPD are used for wireless networks, another protocol, Mobile Internet Protocol (Mobile-IP) is designed primarily for wireline network usage, although wireless access may also be used. Mobile-IP is also still in the specification stage in the Internet Engineering Task Force (IETF) for Internet usage. The present invention is directed towards packet data services for satellite systems, whether such systems are low-orbit, non-geostationary or high-orbit, geo-stationary.

With reference again to the SANs 10 in FIG. 1, each SBS 14 is in communication with a respective satellite 12 orbiting overhead. Via said satellite 12, the SBS 14 can communicate with at least one Mobile Terminal (MT) 18 across an air interface, as is understood in this art. Within each SAN 10 is a Mobile Packet Data Switch (MPDS) 20, which is the physical node or logical node, i.e., groups of functions, that controls the mobility of the MT 18 local to that MT's 18 current location and the protocols of the MT's access to the entire interlinked SAN network, generally referred to by the reference numeral 8. The MPDS 20 performs the functions specified for a Serving GPRS Support Node (SGSN) within the GPRS network 8, a Mobile Serving Function (MSF) of a visiting Mobile Data Intermediate System (MDIS) in a CDPD network or a Foreign Agent in a Mobile-IP network. In the example set forth in the preferred embodiment of the present invention, the MPDS 20 acts as an SGSN.

Also shown in FIG. 1 is a Gateway Mobile Packet Data Switch (GMPDS) 22, which is also the physical node or logical node, i.e., groups of functions, that controls the mobility of the MT 18 at the MT's home location. The GMPDS 22 performs the functions as specified for the Gateway GPRS Support Node (GGSN) in the GPRS network 8, a Mobile Home Function (MHF) of the home MDIS in the CDPD network or a Home Agent in the Mobile-IP network.

The MT 18, as shown in FIG. 1, may include a computer 24 and a cellular handset 26, whereby information, such as within data packets according to the preferred embodiment, is transferred between the computer 24 and handset 26 across a wireline cable or link 28 therebetween. The MT 18 then wirelessly exchanges the information via one or more of the satellites 12 with the respective SAN 10, particularly via the SBS 14 therein. The SBS 14, in turn, relays the signals across a wireline link 30 to the respective MPDS (or SGSN) 20, which is connected to the GMPDS 22 and the backbone 16. The GMPDS 22 is also connected to the backbone 16 and may also be connected to an external network, such as an IP network 32 or a network 34 employing the International Telecommunications Union (ITU-T) X.25 packet switching system standard.

With further reference to FIG. 1, it should be understood that a number of SANS 10 may be interlinked across the backbone 16. It should further be understood that a particular MT 18 associated with a particular SAN 10 is within the coverage or service area of the associated satellite 12 for that SAN 10. For example, upon powering up, the MT 18 selects that satellite service area and listens to the signals from the SBS 14, e.g., on the broadcast channel (BCCH) which carries various system information and signaling. The MT 18 then attaches to the mobile packet data switch 20 and a context between the MT 18 and the MPDS 20 for that SAN 10 is made. Through backbone 16, a context may also be established between the particular MPDS 20 and the MT's home GMPDS node 22, which may lay within a different SAN 10. The MT 18 is then registered therein by its home functions as described by the respective GPRS, CDPD and Mobile-IP procedures.

As is also understood in the art, the SBS 14 communicating with the respective MT 18 measures that MT's position based upon the signals transmitted by the MT or uses positional information provided by the MT 18 itself, and forwards the MT position information to the MPDS 20 in that SAN 10. The positional information thereafter assists in subsequent paging of that MT 18 while it remains attached to the packet data service provided by the ideal case global system, i.e., the system has global coverage.

Figure 2:
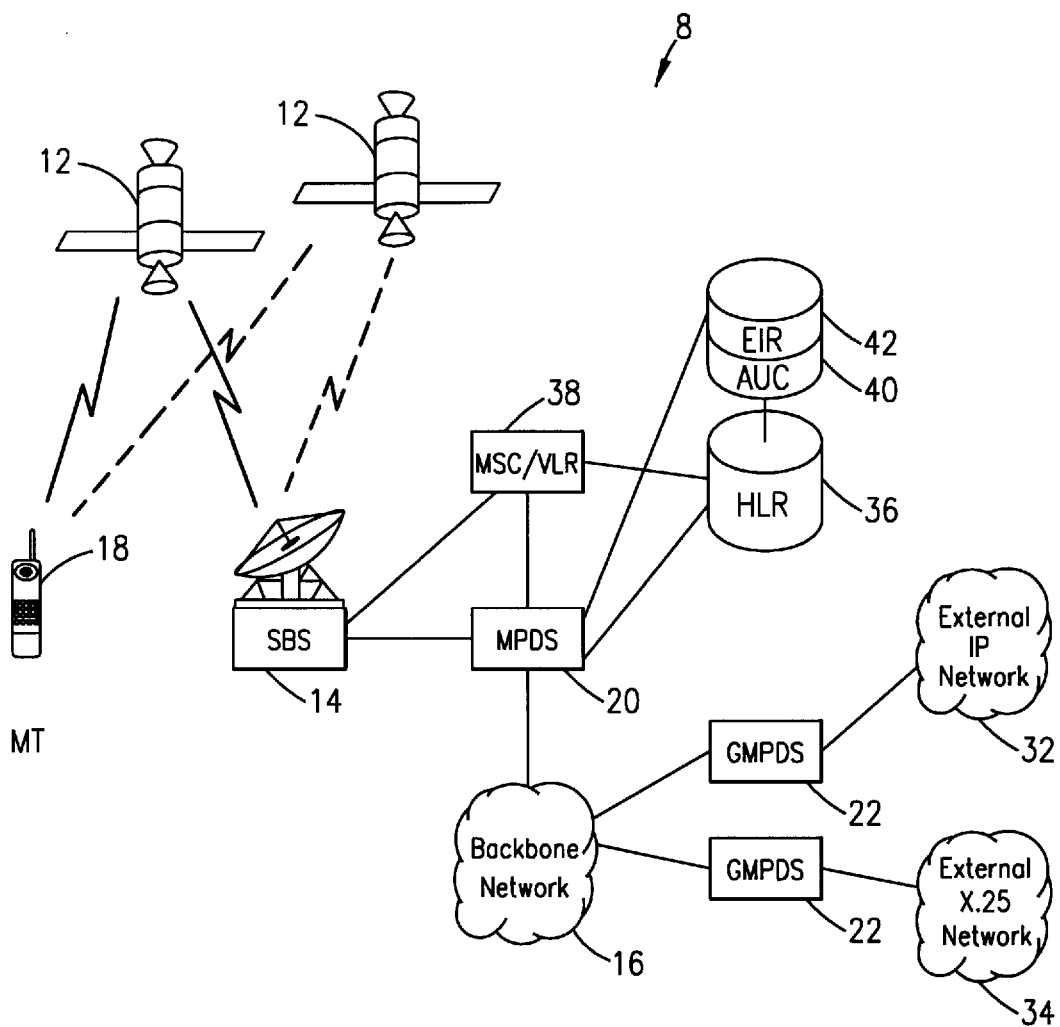
FIG. 2 is a schematic view of the interconnection of the system shown in FIG. 1 with a communication system providing circuit switched services, such as voice calls, modem calls, facsimile calls and short message services.

As discussed, handovers due to temporary shading effects may occur frequently under various circumstances, such as when the lines of sight to different satellites change when the MT 18 moves and also due to the fact that the beams of low orbit satellites sweep across the surface of the earth. Referring again to FIG. 1, an inter-MPDS handover (or handover to another Mobile Serving Function of the MDIS in CDPD or handover to another Foreign Agent in Mobile-IP) is quite complex and time consuming since an entire mobility management context and all subscriber data associated with that MT 18 is transferred and stored in another MPDS 20, updating a database therein as well as updating the context in the GMPDS 22. In certain systems, such as GPRS in GSM, an HLR 36, shown in FIG. 2, is also updated. It should be understood that a conventional HLR may be so employed in the satellite system.

With reference now to FIG. 2, there is shown the aforementioned HLR 36 in communication with an MPDS 20 and an MSC/VLR 38. The MSC/VLR 38 is also in communication with the aforesaid MPDS 20 and the SBS 14 associated therewith. Also shown in FIG. 2 are an Authentication Center (AUC) 40 for authenticating the identity of a given subscriber and an Equipment Identity Register (EIR) 42 for registering particular equipment, e.g., the MT 18, within the local cellular system.

Although the aforedescribed system 8 depicted in FIGS. 1 and 2 may service a multitude of subscriber-related data communication sessions, the aforementioned handover problem with the mobility management context transference is inherent in the system 8. As discussed in more detail hereinafter, the improved system and method of the present invention reduces the number of unnecessary inter-MPDS handovers with concomitant context transferences in the aforedescribed various circumstances, thereby improving system performance and optimizing the use of the associated terrestrial network resources.

Figure 3:
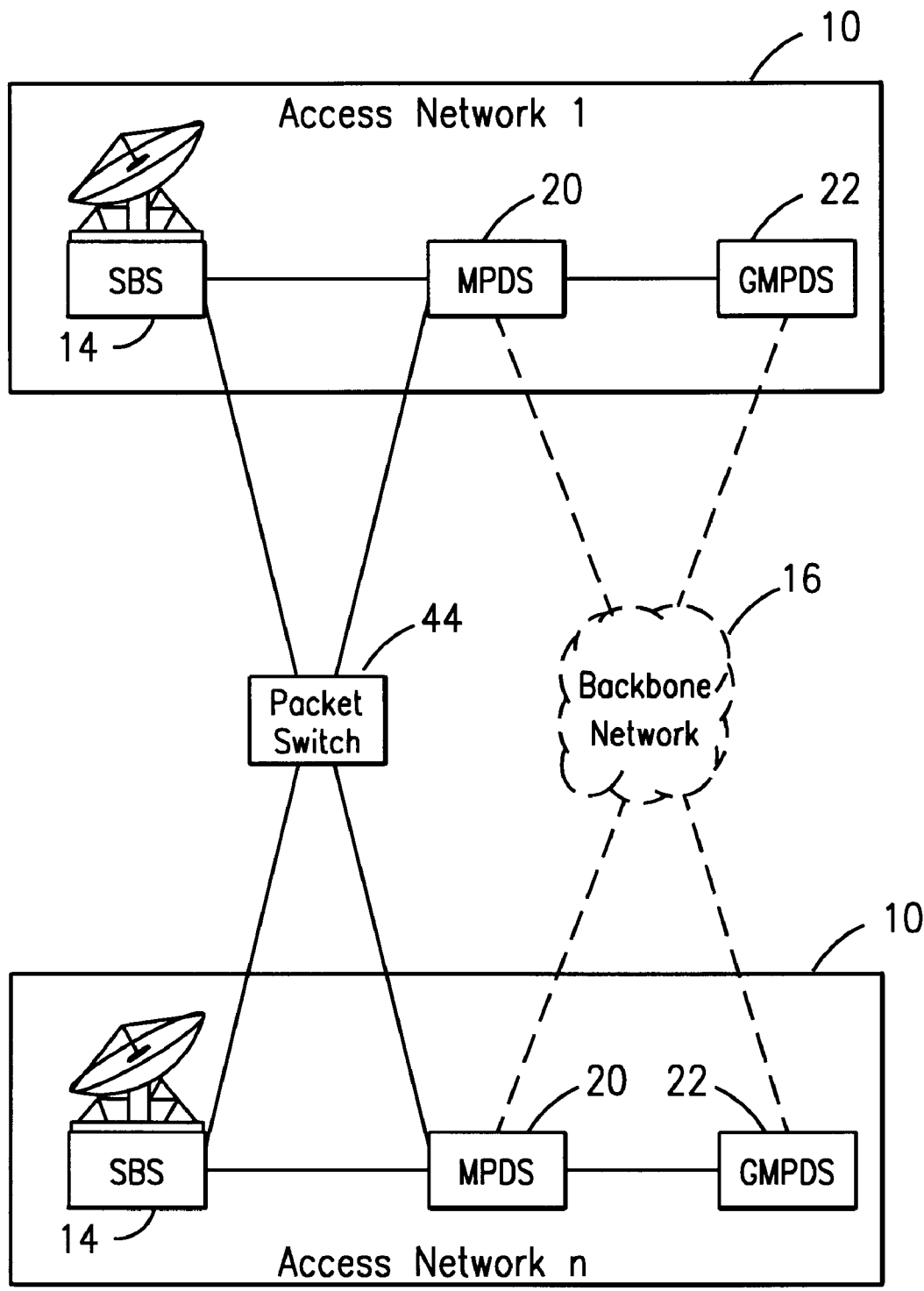
FIG. 3 is a schematic diagram of a satellite communications system incorporating the packet switching capability of the present invention.
Figure 4:
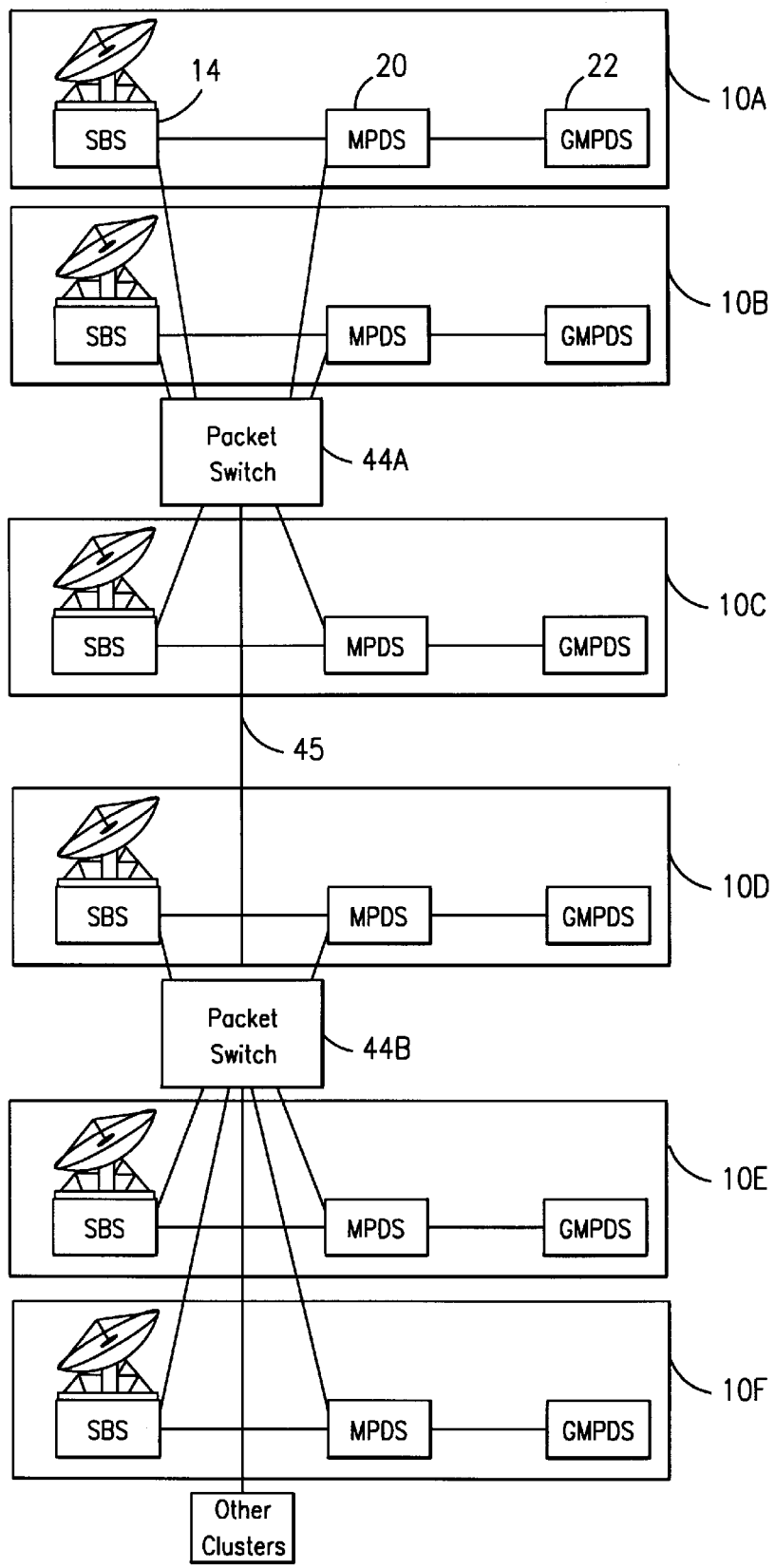
FIG. 4 is an alternative embodiment of the system shown in FIG. 3.

A first modification to the system 8 configuration of SANs 10 shown in FIGS. 1 and 2 is illustrated in FIG. 3, where a packet switch 44 is implemented, interconnecting a plurality of SBS 14 and MPDS 20 devices across a plurality of discrete SANs 10. A particular configuration of the interconnected SANS 10 is shown in FIG. 4, in which a group of SANs, e.g., SANs 10A, 10B and 10C, form a first cluster about a particular packet switch 44A, and another group of SANs, e.g., 10D, 10E and 10F, form another cluster about packet switch 44B, and so on. Each packet switch, e.g., 44A, 44B and others, are connected to each other by a wireline connection 45.

In this manner, each SBS 14 will have a Frame Relay or Asynchronous Transfer Mode (ATM) interface on which various virtual circuits are established, one to each MPDS 20 of substantially contiguous SANs covering a particular area or region. Each such packet switch 44 or virtual circuit so formed corresponds to an interface between any SBS 14 and any MPDS 20 in the entire system 8 and better facilitates interfaces within the components within a cluster.

In the context of this improved configuration incorporating packet switching capability, an inter-MPDS handover is performed when an MT 18 detaches from the service at one location and moves, e.g., while traveling in a car or an aircraft, to another location and reattaches to the service. An inter-MPDS handover is also performed when an MT 18 moves, while attached to the packet data service, far away from the currently serving MPDS 20. To facilitate the above packeting switching capability, the present invention is directed to improvements in circuitry and methods within the SBS 14 and procedures and protocols between the SBS 14 and MPDS 20 devices or nodes in the configurations shown in FIGS. 3 and 4.

In particular, improved criteria may be utilized within the system 8 for initiating inter-MPDS handovers (and contextual information transferences) which are triggered upon particular events. For example, a particular SBS 14 may, based upon the geographic or (x, y) position within the system 8, determine which SAN 10 (and MPDS 20) has the best coverage of the area in which the MT 18 is located. This functionality may be implemented as part of a normal Location Update protocol for that SBS 14, the position being checked during each or a fraction of the Location Update commands. If another SAN 10 is indicated as more appropriate, an SBS 14 will add that new SAN 10/MPDS 20 identification number into the normal Update Request which is then forwarded to the new MPDS 20. It should be understood that the aforementioned normal Update Request is forwarded towards the new MPDS 20 by selection of the Frame Relay virtual circuit (connection) interconnecting the SBS 14 with the new MPDS 20.

Based upon the aforementioned SBS 14 measurement of the (x, y) location for the MT 18, the SBS 14 will within a given time interval check if the currently used SAN is the SAN 10 which has the best coverage of the area where that MT 18 is located. If another SAN 10 is deemed more appropriate, the SBS 14 will request the MT 18 to make a location update. The SBS 14 then ascertains to which MPDS 20 the Location Update Request should be forwarded.

Figure 5:
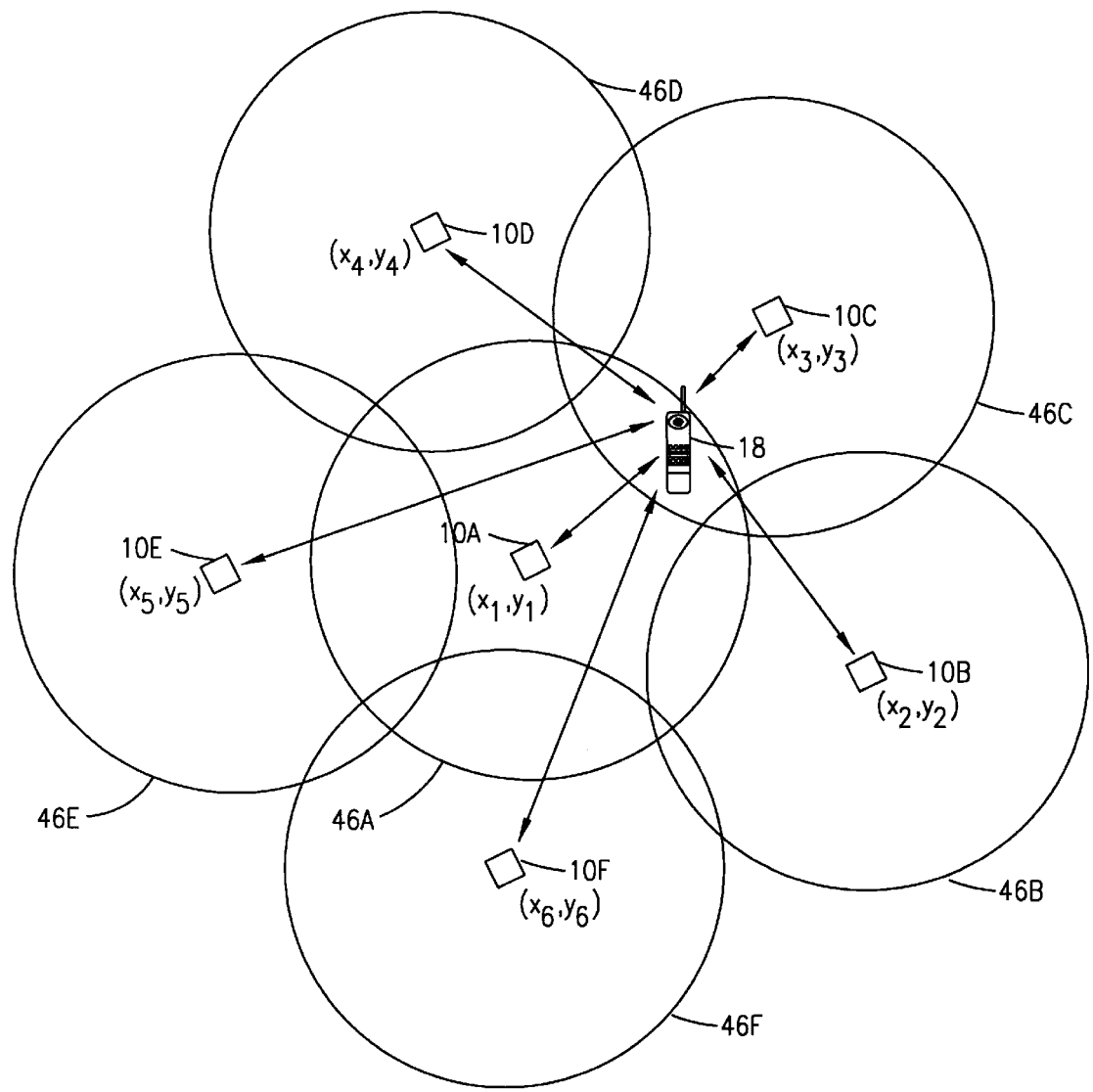
FIG. 5 is an elevated view of a mobile terminal within the range of several service areas of surrounding terrestrial equipment of the satellite system.

By way of illustration of the above, FIG. 5 illustrates a region which is covered by variety of SANs 10. In particular, a number of circles 46 surround respective SANs 10 located at the centers of the circles 46, each said circle defining a service area for the respective SAN 10 (and MPDS 20) therein. The coordinates $(x_1, y_1)$ for center circle 46A define the aforementioned center of that circular service area for SAN 10A. Corresponding circles 46B–46F are formed about central coordinates $(x_2,y_2)$, $(x_3,y_3)$, $(x_4,y_4)$, $(x_5,y_5)$ and $(x_6, y_6)$, respectively. Each of the SBS 14 devices within the aforedescribed circles 46 contain a list therein of information relating to the neighboring SANs 10. For example SAN 10A (corresponding to circle 46A) contains information pertaining to its neighboring SANs 10, i.e., SANs 10B–F.

In an effort to ascertain whether a handover and transference of context information are warranted, the distance between the MT 18 at (x, y) and the SAN 10A (and MPDS 20 therein), to which the MT 18 is attached, is determined. This measurement is generally made using the Euclidean coordinates, as follows:

$$d_1^2=(x-x_1)^2+(y-y_1)^2$$

as is well understood in the mathematical arts, where $d_1$ represents the linear, planar distance of the MT 18 from the SAN 10 equipment to which the MT 18 is currently attached.

The distance value $d_1$ (or the squared value thereof) is then compared with the radial length (R) of the circle 46A, a value known by the respective SBS 14 within the system 8. If the MT 18 remains within the circle 46A, i.e., $d_1<R$, then there is as yet no need to handover or transfer mobility management information to another SAN 10, e.g., contiguous SAN 10C (circle 46C) in FIG. 5. For example, the MT 18 may temporarily lose contact with the satellite 12 due to a large building, in which case communications are maintained through an inter-satellite handover. The transference of the mobility management information for that MT 10, however, is unnecessary in the present invention since the MPDS 20 associated with the particular SAN, i.e., SAN 10A, remains the same through the packet switching connection 44.

If the MT 18 has strayed outside of the SAN 10A to which it is attached, i.e., outside circle 46A, then another SAN 10 may be selected to service that MT 18, as discussed further herein. It should, therefore, be understood that in the present invention, the MT 18, when within the MPDS service area of multiple SANs 10, e.g., both SAN 10A and 10C in FIG. 5, remains attached to SAN 10A even though within range of another SAN. In this manner, the aforementioned problems of vacillation between adjacent or overlapping SANs 10 is ameliorated or avoided altogether. Instead, mobility management functionality and other subscriber data remains with the SAN 10A up and until the time when the MT 18 crosses an ascertainable threshold or line of demarcation.

Figure 6:
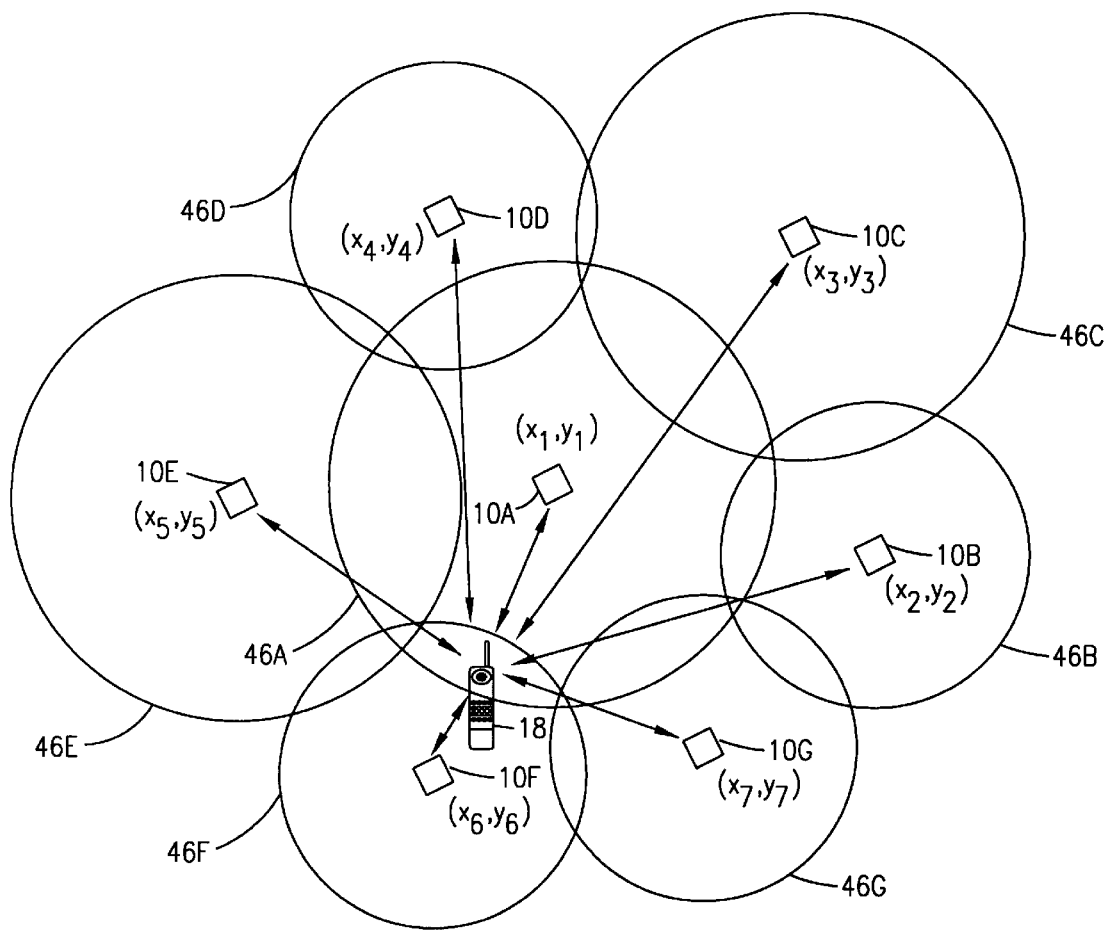
FIG. 6 is an alternative configuration of the service areas in FIG. 5.

It should be understood that although the radial distances of the SANs 10, may be roughly equivalent, as shown in FIG. 5, this need not be so and a variety of radial distances of surrounding SANs 10 may be presented, as illustrated in FIG. 6. It should further be understood that the size of the circular MPDS service can be modified for traffic planning. For example, an area with a higher usage of Packet Data traffic is better served if the appropriate service area 46 is reduced, and a neighboring service area 70 is enlarged, overlapping the smaller one.

When the MT 18 in question does cross over the substantially circular boundary 46A of its SAN 10A, i.e., $d_1 \geq R$ as discussed, then the various distances of the MT 18 at (x, y) from the centers of the aforementioned neighboring circles 46 are determined as follows:

$$d_2^2 = (x - x_2)^2 + (y - y_2)^2$$
$$\vdots$$
$$d_k^2 = (x - x_k)^2 + (y - y_k)^2$$

where k represents the total number of circles 46 and $k-1_1$ represents the number of adjacent (neighboring) and non-attached MPDSs 20 under consideration.

That SAN 10 nearest the MT 18, i.e., the shortest $d_k$ calculated, is then selected. However, a check must then be made to determine if the MT 18 is actually within the service area 46 of the newly-selected SAN 10, i.e., the distance di for that MT 18 from the SAN is smaller than the radius ($R_i$) for that SAN 10. If $d_i < R_i$ (or the squares thereof), then a handover may then occur from the SAN 10A to the appropriate adjacent SAN 10, which, for example, is SAN 10F in FIG. 6. If, however, $d_i \geq R_i$, then the MT 18 is outside of the service area of that SAN 10 even though closest to it and another SAN 10 must be selected and a check made whether the MT 18 is within the service area of that SAN 10.

It should be understood that there is an advantage in minimizing the distance of an MT 18 from the appropriate MPDS 20 node, particularly in terminating the access protocols and in accessing the packet data network, as shown in FIGS. 3 and 4, as quickly as possible. Also, due to the aforementioned shading effects in a satellite 12 environment, it is important to select that SAN 10 (and associated MPDS 20) with the best long-term radio coverage where the MT 18 is located. The best long-term radio coverage is usually attained by the closest, terrestrially-based SAN 10 to the MT 18, which is due to the fact that the antennas of the respective SAN 10 sees the largest common set of available satellites 12. Accordingly, during the period of attachment of the MT 18 to the aforementioned packet data network or service, the SBS 14 will ascertain, in the aforedescribed manner and based upon the (x,y) location, e.g., in latitude and longitude coordinates, of the MT 18, the SAN 10 with the best coverage, and forward on Attach Request, after adding the information for the MT 18 position, to the MPDS 20 of that SAN 10.

With reference again to FIGS. 3 and 4, the MPDS 20 mobility management procedures governing MT 18 handling preferably use Sub-Network Dependent Convergence (SNDC) and Logical Link Control (LLC) protocols for reliable message transmission across the air interface. The MT 18 selects a given spot beam of a particular satellite 12 and listens for the BCCH on the spot beam. At some later point, the MT 18 invokes the location update procedure, as described.

As in terrestrially-based wireless systems, location updates are performed to provide the network with adequate information about the location of the MT 18 within the network so as to be able to later page that MT 18 therein. In a normal case, a location Update Request is routed from the SBS 14 to the attached MPDS 20 node for that SAN 10. The SBS 14 has a context for the MT 18 which indicates the Frame Relay connection to use to send the request to the attached MPDS 20. However, for a certain fraction of (or possibly all) Normal Updates or after a certain time period expires, the SBS 14 will, based upon the (x, y) MT 18 position and the attached MPDS 20, determine if an inter-MPDS 20 handover is appropriate, using the aforementioned equations. This information is then added to the Normal Update Request to be forwarded to the MPDS 20 node. If the SAN MPDS identification number has changed, then this could trigger an inter-MPDS handover.

Figure 7:
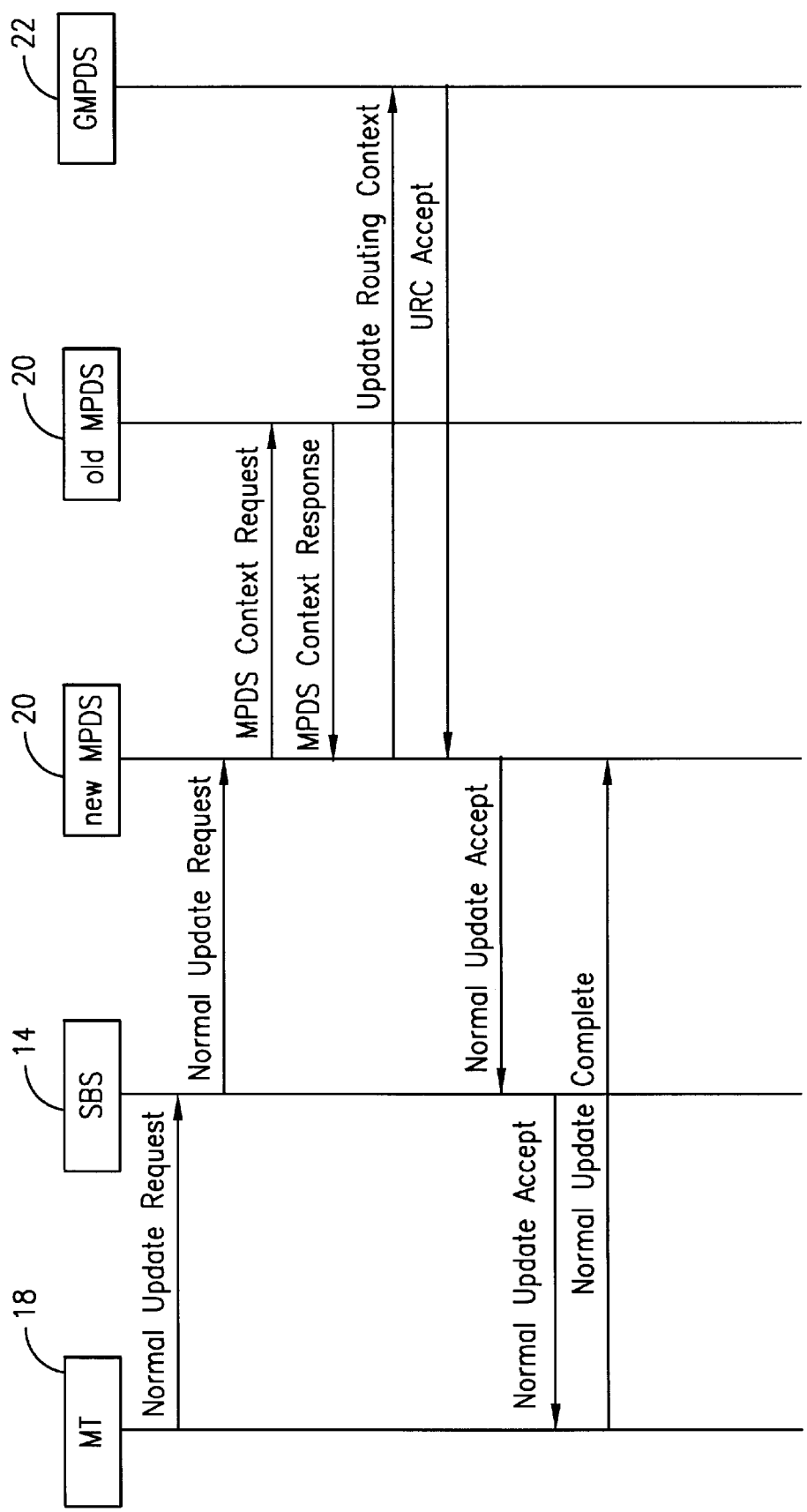
FIG. 7 is a method chart illustrating the steps in implementing an inter-satellite system handover.

Shown in FIG. 7 is a procedural chart of steps to follow in implementing the improved inter-MPDS handover as set forth in the present invention. First, the pertinent MT 18 sends a Normal Update Request to the SBS 14 associated with that MT 18. The SBS 14 then estimates the position of the MT 18 and other relevant information to ascertain whether an inter-MPDS handover is necessary and which of the adjacent MPDS 20 nodes will take over the servicing of the MT 18. If an inter-MPDS handover is warranted, the SBS 14 forwards a Normal Update Request to the new MPDS 20, which sends an MPDS Context Request to the old MPDS 20 in order to determine the mobility management context for that MT 18.

The old MPDS 20 then responds to the new MPDS 20 with an MPDS Context Response Command, which includes the aforementioned mobility management data and security information. The old MPDS 20 then stores the new MPDS 20 address until the old MPDS 20 mobility management context is canceled, enabling the old MPDS 20 to forward data packets to the new MPDS 20. The old MPDS 20 also starts a timer, at the expiration of which the MT context is deleted.

The new MPDS 20 then forwards an Update Routing Context Command, containing the address of the new SGSN and an identification of the communication channel to be used between the new SGSN and the GMPDS 22 to the GMPDS 22 concerned, which updates the context fields therein and returns an acknowledgment. The new MPDS 20 then validates the presence of the MT 18, e.g., determines that the subscriber is not restricted to a particular service area.

If all checks are successful, then the new MPDS 20 constructs a new mobility management context for that MT 18, and a logical link (LLC) is established between the new MPDS 20 and the MT 18. The new SGSN sends a Normal Update Accept to the MT 18, which includes the allocated identifier of the LLC. The MT 18 then confirms the allocated LLC identifier in the Normal Update Complete message.

Figure 8:
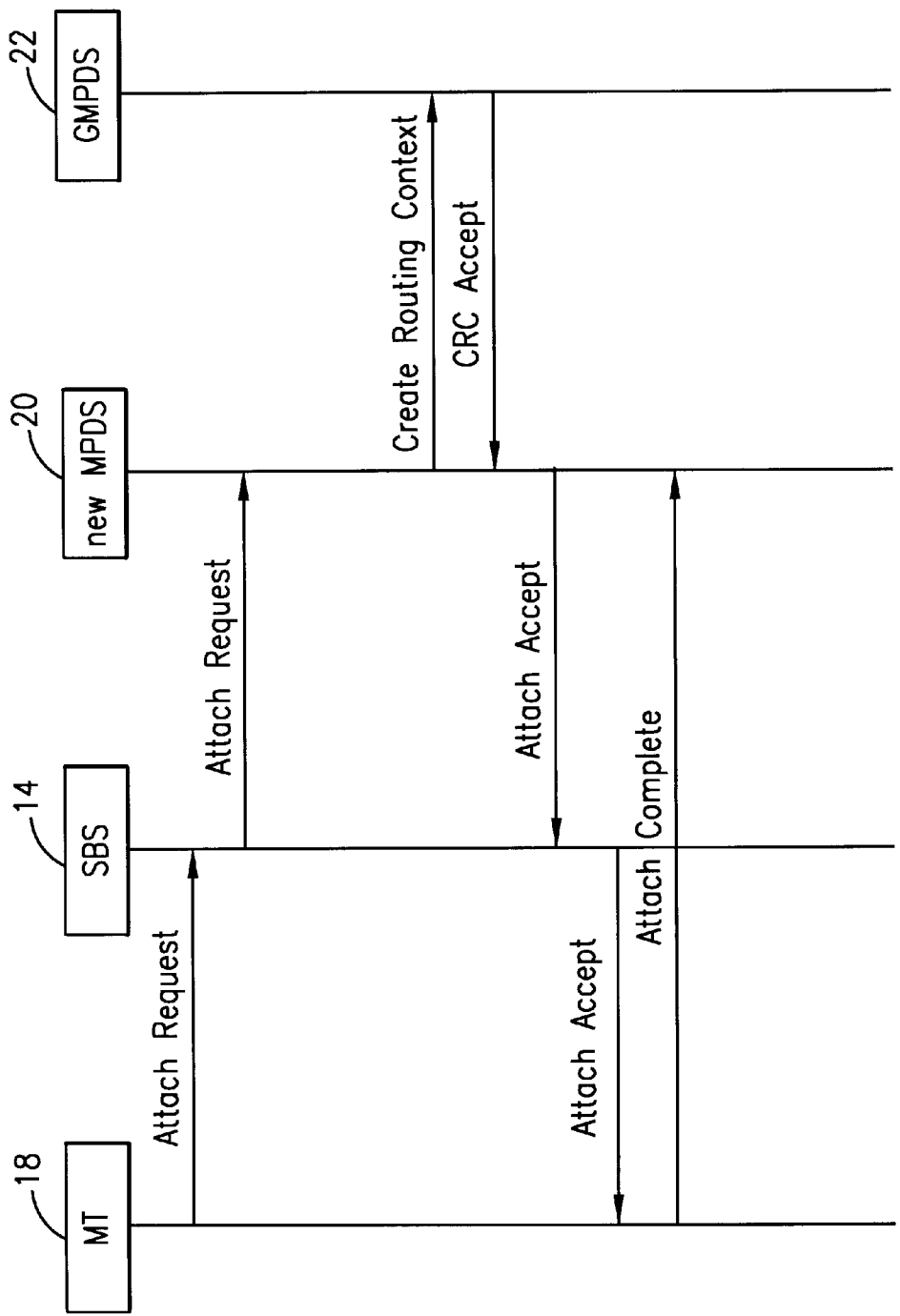
FIG. 8 is a method chart illustrating the steps in implementing an attachment procedure for said mobile terminal.

With reference now to FIG. 8, there is illustrated steps followed in attaching the mobile terminal 18 to an MPDS 20. The mobile terminal 18 first sends an Attach Request to the pertinent SBS 14 which determines the position of the MT 18. The SBS 14 will then, based upon the (x, y) position of the MT 18 determine which new MPDS 20 best serves the area in which the MT 18 is now located, as discussed hereinbefore. The SBS 14 then forwards an Attach Request to the selected MPDS 20. It should be understood that the SBS 14 incorporates the positional information of the MT 18 in this Attach Request.

In the attach, the MT 18 provides its International Mobile Subscriber Identification (IMSI) or the LLC identifier, as described. The IMSI or other identification information is then used by the new MPDS 20 to identify the subscriber, to check their subscription to the service and for charging. A Routing Context Command is then sent to the GMPDS 22 for registration with the GMPDS node, which returns an acknowledgment.

After successfully attaching to the new MPDS 20, the new MPDS 20 forwards an Attach Accept to the MT 18, which enters into a ready state. Mobility management contexts are then established in the MT 18 and the new MPDS 20.

It should be understood that although he preferred embodiment of the present invention is used in reducing the informational transference in inter-satellite communications, the principles of the present invention are also applicable to other telecommunications systems, such as a cellular system, a portion of which is illustrated in FIG. 2. In particular, the subject matter of the present invention is useful in reducing information transference between HLRs 36 and other such higher-level nodes which use the packet switch 44 and other components of the present invention.

The previous description is of a preferred embodiment and alternatives for implementing the invention, and the scope of the invention should not necessarily be limited by this description. The scope of the present invention is instead defined by the following claims.

What is claimed is:

1. A handoff system for controlling mobile terminal handoffs between network systems, said handoff system comprising:
    a first base station within a first network system, a mobile terminal being in wireless communication with said first base station;
    a second base station within a second network system;
    a mobile packet data switch connected to said first base station, said mobile packet data switch containing mobility management information about said mobile terminal;
    packet switching means, connected to said first and second base stations and said mobile packet data switch, said first and second base stations and said mobile packet data switch intercommunicating through said packet switching means;
    distance measuring means for measuring the distance of said mobile terminal from said first base station and, when said mobile terminal becomes outside the range of said first network system, measuring the distances of said mobile terminal from a second and a plurality of other network systems adjacent said first network system, the closest of said network systems being said second network system, and
    handoff means for handing off said mobile terminal from said first base station within said first network system to said second base station within said second network system, said mobility management information about said mobile terminal remaining within said mobile packet data switch, said second network system accessing said mobility management information about said mobile terminal at said mobile packet data switch through said packet switching means.

2. The handoff system according to claim 1, wherein said first and second network systems are satellite-based telecommunications systems, said first and second base stations being satellite base stations, said mobile terminal being in communication with said first and second satellite base stations via at least one satellite.

3. The handoff system recording to claim 1, wherein said first and second network systems are terrestrially-based telecommunication systems.

4. The handoff system according to claim 3, wherein said first and second network systems comprise respective home location registers.

5. The handoff system according to claim 1, further comprising:
    a gateway mobile packet data switch within at least one of said first and second network systems.

6. The handoff system according to claim 5, wherein said gateway is connected to an external network.

7. The handoff system according to claim 1, further comprising:
    a backbone network connected to said mobile packet data switch and a plurality of other mobile packet data switches associated with a corresponding plurality of other network systems access network systems.

8. The handoff system according to claim 1, wherein said packet switching means is divided into a multiplicity of packet switches, a plurality of said network systems each being connected to a respective packet switch.

9. The handoff system according to claim 8, wherein said multiplicity of packet switches are interconnected.

10. The handoff system according to claim 1, further comprising:
    coordinate measuring means, connected to said distance measuring means, for measuring a coordinate position of said mobile terminal.

11. The handoff system according to claim 10, wherein said coordinate measuring means forwards latitude and longitude coordinates to said distance measuring means.

12. The handoff system according to claim 1, wherein said distance of said mobile terminal from said first base station is calculated by said distance measuring means by the formula:

$$d_1^2 = (x-x_1)^2 + (y-y_1)^2$$

where (x, y) is the position of the mobile terminal, $(x_1, y_1)$ is the position of the first base station and $d_1$ is the distance therebetween.

13. The handoff system according to claim 12, wherein said distances of said mobile terminal from said second and other network systems is calculated by said distance measuring means by the formula:

$$d_k^2 = (x-x_k)^2 + (y-y_k)^2$$

where $(x_k, y_k)$ is the position of the respective second or other network systems and $d_k$ is the respective distance from the mobile terminal.

14. A method for controlling handoffs of a mobile terminal between network systems, said method comprising the steps of:
    measuring the position of said mobile terminal in relation to a first network system;
    calculating the distance of said mobile terminal from a first base station within said first network system, mobility management information about said mobile terminal being stored within said first network system;
    determining if said distance is greater than a distance threshold associated with said first network system;
    if said distance exceeds said distance threshold, calculating a plurality of other distances of said mobile terminal from a plurality of other base stations in a plurality of other network systems, the closest of said other distances from the other network systems being a second base station in a second network system;
    selecting said second base station of said second network system for handoff; and
    handing off said mobile terminal from said first base station within said first network system to said second base station within said second network system, said mobility management information about said mobile terminal remaining within said first network system.

15. The method according to claim 14, further comprising, after said step of selecting, the step of:

determining if said mobile terminal is within a second threshold distance associated with said second network system, where if said mobile terminal is not within said second threshold distance, another shortest distance is selected, said another shortest distance corresponding to a third network system.

16. The method according to claim 14, further comprising, before said step of measuring the position of said mobile terminal, the step of:

sending, from said mobile terminal, an update request to said first base station within said first network system.

17. The method according to claim 16, wherein said update request is a Location Update command.

18. The method according to claim 14, further comprising, after said step of selecting said second base station, the step of:

sending, from said first base station, an update request to said second network system.

19. The method according to claim 18, wherein said update request is a Location Update command.

20. The method according to claim 14, further comprising, after said step of handing off, the step of:

referencing, by said second network system, said mobility management information about said mobile terminal via a packet switch interconnecting said first and second network systems.

21. The method according to claim 14, wherein said step of measuring distances further comprises the step of:

determining the position of said mobile terminal using coordinates.

22. The method according to claim 21, wherein said steps of calculating the distances of said mobile terminal from the respective base stations further comprise the steps of:

determining the position of said respective base stations using coordinates; and calculating said distances using said coordinates.

23. The method according to claim 14, wherein said step of selecting said second base station comprises the steps of:

determining if said selected second base station is within a radial threshold for said second base station; and if said second base station is outside said radial threshold, selecting a third base station of a third network system for handoff.

24. The method according to claim 14, wherein said first and second network systems are satellite-based telecommunications systems, said first and second base stations being satellite base stations, said mobile terminal being in communication with said first and second satellite base stations via at least one satellite.

25. The method according to claim 14, wherein said first and second network systems are terrestrially-based telecommunication systems.

26. The method according to claim 14, further comprising, after said step of handing off said mobile terminal to said second network system, the steps of:

waiting a predetermined handoff time period; and if said mobile terminal remains handed-off to said second network system, transferring said mobility management information, within said first network system, to said second network system.

* * * * *

UNITED STATES PATENT AND TRADEMARK OFFICE
CERTIFICATE OF CORRECTION

PATENT NO : 6,137,783
DATED : October 24, 2000
INVENTOR(S) : Krister Sallberg

It is certified that error appears in the above-identified patent and that said Letters Patent are hereby corrected as shown below:

Column 7, line 14    Replace "$d_2^2$"
With --$d_2^2$--

Column 7, line 16    Replace "$d_k^2$"
With --$d_k^2$--

Column 7, line 26    Replace "di"
With --$d_i$--

Signed and Sealed this

Twenty-second Day of May, 2001

Attest:

NICHOLAS P. GODICI

Attesting Officer    Acting Director of the United States Patent and Trademark Office